May 9, 1939.  C. P. KIMMEL  2,157,455
BEARING FOR ROLLING MILLS
Filed July 31, 1936   4 Sheets-Sheet 1
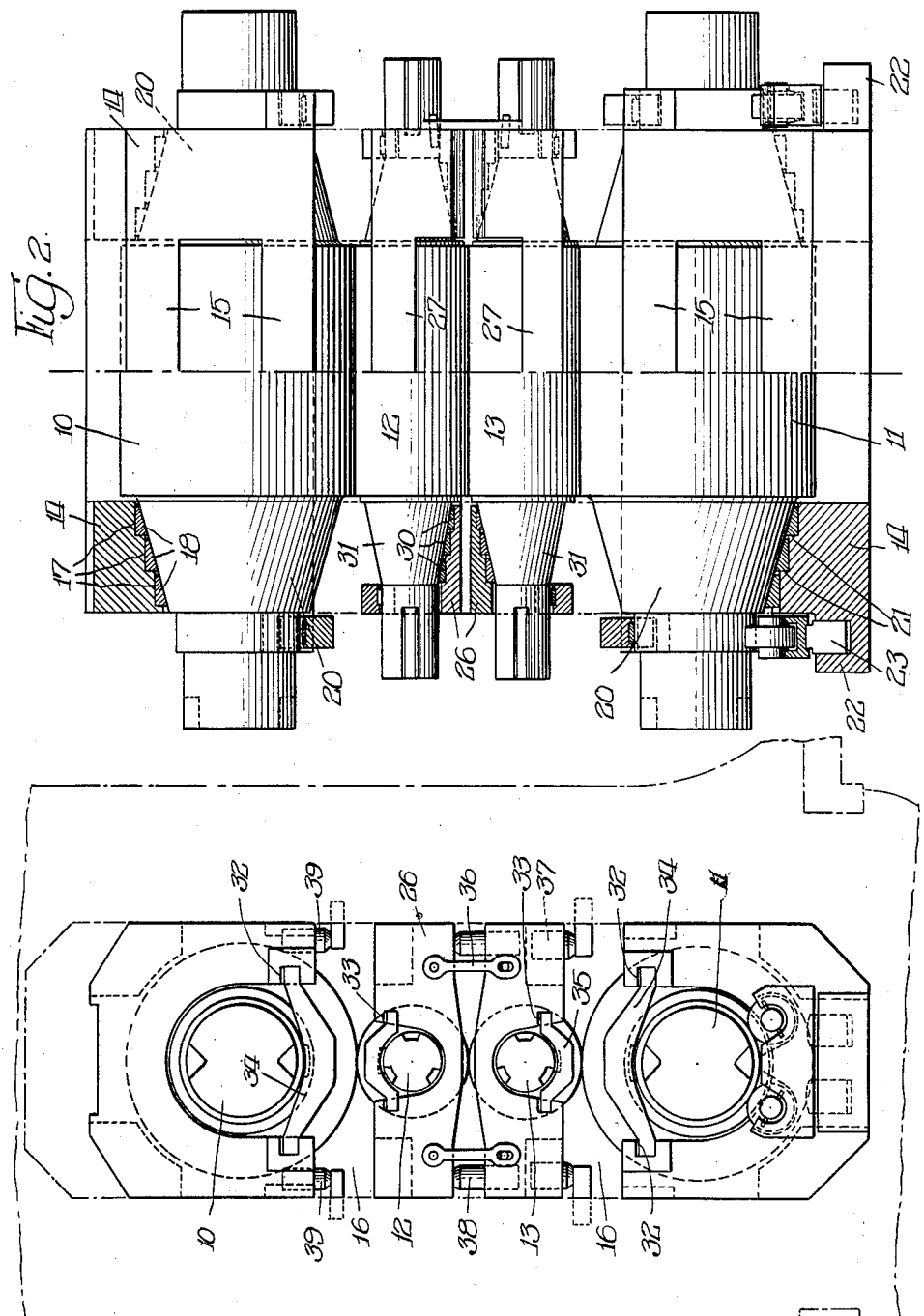
Inventor:
Charles P Kimmel
By Usina + Rauber Attys

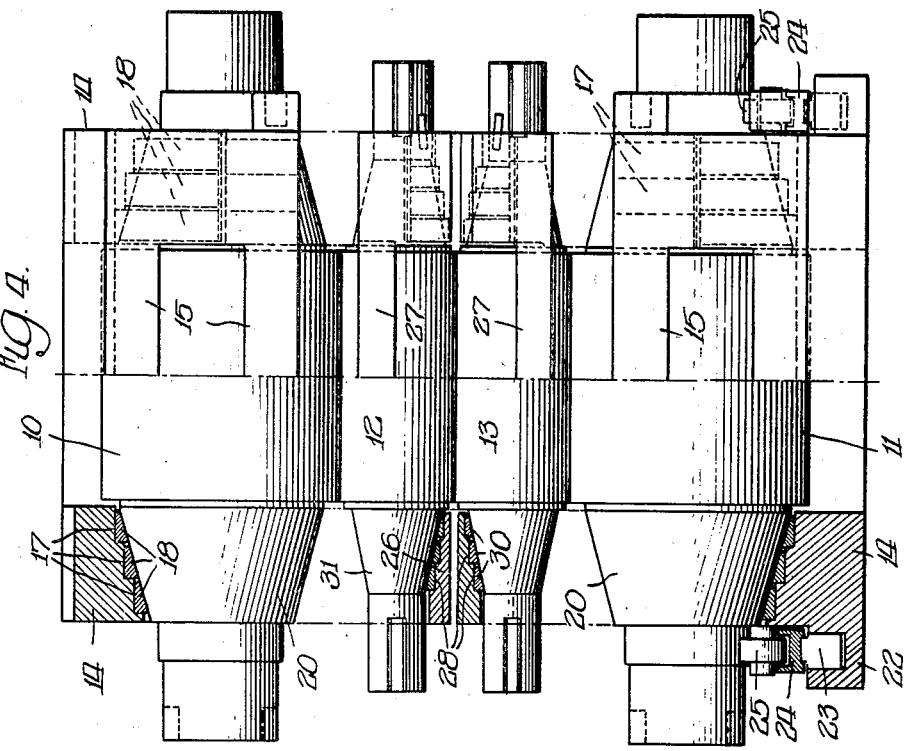

May 9, 1939.  C. P. KIMMEL  2,157,455
BEARING FOR ROLLING MILLS
Filed July 31, 1936  4 Sheets-Sheet 3
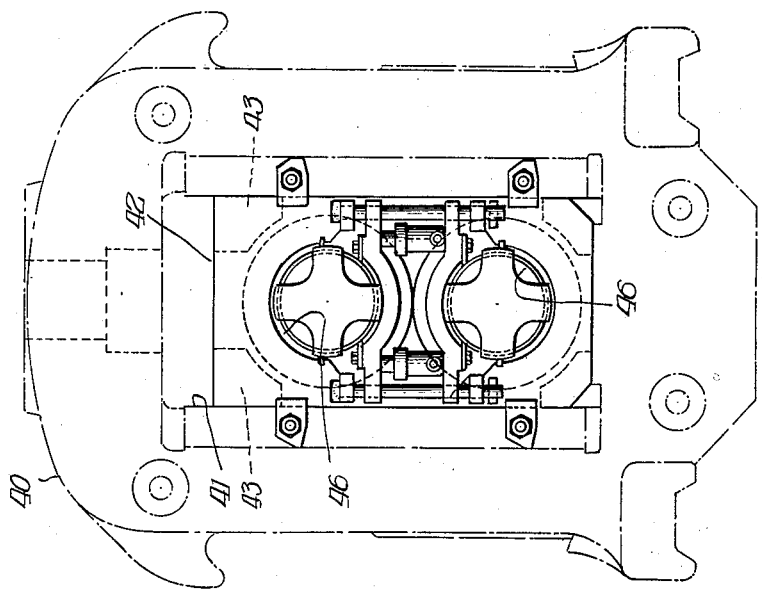
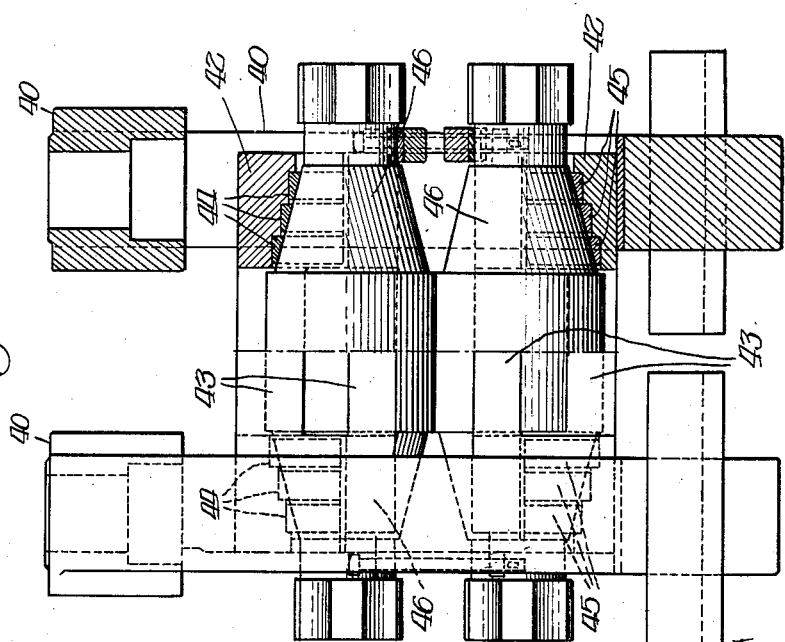
Inventor:
Charles P. Kimmel,
By Abina & Rauber
attys.

May 9, 1939.  C. P. KIMMEL  2,157,455
BEARING FOR ROLLING MILLS
Filed July 31, 1936  4 Sheets-Sheet 4
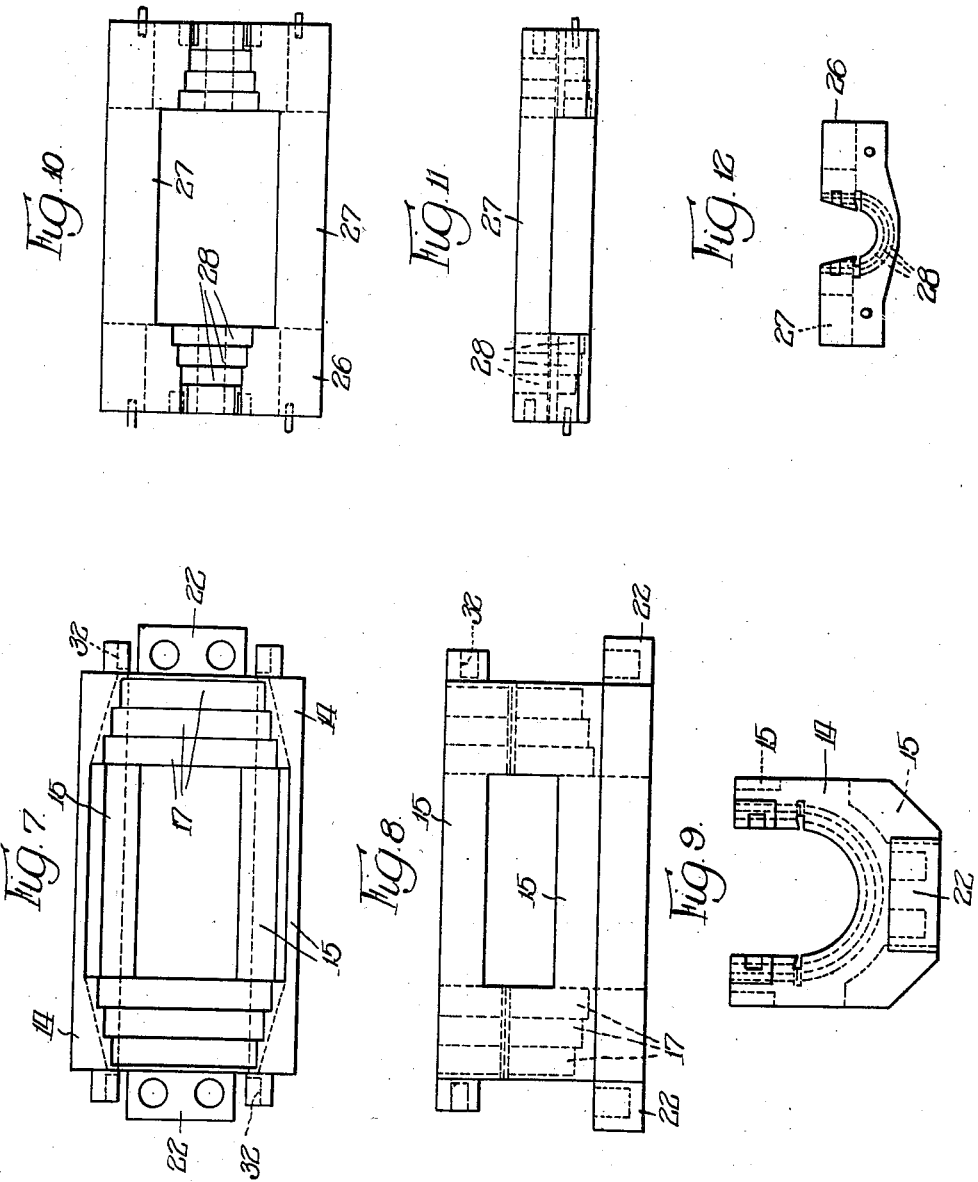
Inventor:
Charles P Kimmel
By Usina & Rauher attys Patented May 9, 1939

2,157,455

UNITED STATES PATENT OFFICE 2,157,455

BEARING FOR ROLLING MILLS

Charles P. Kimmel, Gary, Ind.

Application July 31, 1936, Serial No. 93,605

7 Claims. (Cl. 80—38)

The invention relates to rolls such as used in rolling mills, and more particularly to the design of the roll necks and of the bearings in which the roll necks rest and rotate, and which bearings constrain said rolls against heavy pressure caused by rolling.

For certain classes of work such as the rolling of hot or cold steel strips, anti-friction bearings, principally of the roller type, have been commonly used in modern rolling mills. Practical considerations limit the size of the roll necks when such roller bearings are used, resulting in objectionable spring or bending in the necks when the steel is passing between the rolls. This causes serious difficulties in maintaining the ideal contour of the piece being rolled.

An object of the invention is to provide a construction that will minimize or eliminate such roll spring and its resulting objectionable effect on the rolled steel.

In the use of bearings of the conventional anti-friction type space limitations require that the necks of the rolls shall be materially smaller in diameter than the body of the roll and as the tendency of the roll to bend and produce a strip of unequal thickness is largely dependent upon the resistance of the necks of the rolls to the bending action, another object of the invention is to increase the diameter of the roll neck considerably. The larger diameter may be nearly as great as that of the body of the roll, or may approximate three-fourths of the diameter of the body of the roll and the same will taper to the outer or smaller end at an angle of from ten to twenty degrees. Thus the quantity of material in the necks, particularly at the junction of the roll body, is relatively large.

Another object of the invention is to provide a novel construction consisting of heavy blocks integrally joined by means of corner pieces and side pieces to form a rigid frame and which can slide horizontally in position through the housing window.

A further object of the invention is to provide a stepped bearing construction, together with means for effecting adjustment of the bearing elements in a line parallel with the axes of the roll. By mounting the rolls in a rigid saddle and taking care of end thrusts by the tapered necks the difficulties encountered with separate bearings of the conventional type are eliminated.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts:

Figure 1 is an end elevational view of a four-high roll stand embodying the features of the invention;

Figure 2 is a front elevational view, parts being shown in section, of the roll stand shown in Figure 1;

Figure 3 is an end elevational view of the roll stand of Figure 1 with the yokes and links removed;

Figure 4 is a front elevational view, parts being shown in section, of the roll stand of Figure 1 with the yokes and links removed;

Figure 5 is a front elevational view, parts being shown in section, of a two-high roll stand embodying the features of the invention;

Figure 6 is an end elevational view of the roll stand shown in Figure 5;

Figures 7, 8 and 9 are top, side and end views, respectively, of the frame for the back-up rolls; and Figures 10, 11 and 12 are top, side and end views respectively of the frame for the working rolls.

Referring particularly to Figures 1 to 4 inclusive of the drawings, the four-high roll stand disclosed consists of upper and lower back-up rolls 10 and 11, respectively and a pair of working rolls 12 and 13 considerably smaller in diameter than the back-up rolls. The rolls 10 and 11 are journalled and supported in frames consisting of heavy bearing blocks 14 which are integral with the joining members 15. The frames can be horizontally entered into position through the housing window 16, Figure 1.

Each bearing block 14 is provided with three semi-cylindrical grooves 17, the diameters of which increase in a direction toward the body of the respective back-up roll. The grooves accommodate the bearing elements 18 which are trapezoidal in longitudinal cross section, having their inner surfaces shaped so as to conform to the tapering surfaces of the truncated cone-shaped roll necks 20 of the back-up rolls 10 and 11. Perfect fitting of the bearing elements may be attained and maintained by shims placed between the shoulders of the machined grooves 17 and the outside faces of the bearing elements.

Referring to the frames for the lower backing-up roll, it will be noted by reference to Figures 2 and 4 that extensions 22 are cast integrally therewith at each end of the frame. Each extension is cored to provide a pair of recesses, each of which receives a hydraulic jack 23 engaging with the saddles 24 which carry small rollers 25. It is known that a bearing having a special amount of bearing contact and particularly phenolic composition bearings, when at rest for a period of time, may form an adhesive contact which requires extra power to start the roll in motion. As the four-high mill construction shown in the drawings does not require that the top and bottom back-up rolls be driven direct, but merely through contact with the driven work rolls, difficulties may occur in starting rotation of the bottom back-up roll. Therefore, the invention provides the small lifting rollers 25 which may be elevated with respect to the frames by the hydraulic jacks 23, thus releasing the roll necks 20 of the bottom back-up roll from contact with their respective bearings. By this operation the load is transferred to the rollers, which offer much less resistance to starting than would be the case if the roll were supported by its bearings. The operation is only momentary since as soon as the bottom back-up roll starts rotating the pressure jacks are released and the roll is permitted to drop to its working position in the bearings.

The working rolls 12 and 13 are carried by frames which include end stools 26 having integral therewith the joining members 27 forming a window through which may pass material that is being rolled. The frames for the working rolls are likewise provided with semi-cylindrical grooves 28 of different diameters which become progressively larger in a direction toward the roll body. The grooves receive bearing elements 30 having inner surfaces conforming with the taper of the roll necks 31 of the working rolls 12 and 13. The bearings are adjustable by means of shims to obtain a perfect fit on the roll necks as previously explained in connection with the back-up rolls.

To expedite the handling of rolls and frames when changing or replacing the rolls, the frames for the back-up and working rolls are provided with recesses 32 and 33, respectively. The pair of recesses 32 at each end of the frame receive a removable yoke 34 and in a like manner each pair of recesses 33 receives a removable yoke 35. In addition the bearing stools 26 for the working rolls are coupled at each end by eye links 36. The pressure jacks 37, 38 and 39 can be operated independently in sets of four to facilitate in connection with the use of the required yokes 34 and 35 and links 36 the removal and positioning of the rolls.

Figures 5 and 6 show a two-high roll stand embodying the features of the invention, which is characterized by two working rolls, the back-up rolls in this instance being omitted. The mill housing 40 is formed with an opening 41 within which is inserted the bearing frames for the working rolls. Said frames comprise heavy bearing blocks 42 which are integral with bearing members 43. The bearing blocks of both upper and lower frames are each formed with three semi-cylindrical grooves 44, the diameters of which increase in a direction toward the body of the respective working roll. Bearing members 45 of trapezoidal shape in longitudinal cross section are located within the grooves and which have their inner surfaces shaped so as to conform to the tapering surface of the roll neck 46 of the working rolls. As previously explained in connection with Figures 1 and 2, perfect fitting of the bearing elements can be maintained by placing shims between the shoulders of the machine grooves and the outside faces of the bearing elements.

The roll necks of the backing rolls and also the working rolls, according to the invention, are materially increased in diameter so as to resist the tedency of the roll to bend during rolling, which produces strip material of unequal thickness. The larger diameter at the junction with the roll body effectively withstands all bending action to which the rolls are subjected and accordingly strip material produced by rolling mills of the invention will have the desired contour throughout its length.

As a result of the formation of cylindrical grooves within the bearing block, surfaces are provided which result in perpendicular shoulders. The bearing fitted within each groove is trapezoidal in cross section, one apex of the triangle being cut off in order to enable the proper functioning of adjacent bearing elements. Considering the cross section of the bearing elements as triangular the base of the triangle rests upon the surfaces and is parallel to the axis of the roll, the altitude of the triangle co-operating with the shoulder or abutment while the hypotenuse of the triangle conforms to the taper of the roll neck. By inserting shims between the shoulder and the edge of the bearing elements a very accurate fitting of the bearing elements can be attained as the shims serve to move the bearing elements inward on a line parallel with the axis of the roll, causing the bearings to cooperate with the larger diameters of the neck. By using bearing elements composed of a well known phenolic composition a satisfactory lubrication with water by conventional means is effective, thereby eliminating the need for oil or grease.

As a result of the stepped bearing construction of the invention, it is possible to greatly stiffen the roll not only by increasing the diameter of the necks but by shortening the necks. By using the present bearing structure and phenolic condensation bearings it is possible to secure ample bearing area with a reduced length of neck. It will be noted that the horizontal components of the rolling pressure resulting from the tapered form of the bearings are absorbed by the rigid frames and are not transmitted to the housings. It will also be understood that the described construction is equally applicable to two or three high mills and to other forms of bearings as well as bearings for rolls.

In connection with the four-high rolling mill shown in Figures 1 to 4 inclusive, it is possible to modify the structure by equipping the mill with working rolls of conventional design, with conventional bearings and providing the conical bearing members of the invention for the back-up rolls only. It is to be understood that the invention contemplates this modification.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a rolling mill, in combination, a pair of working rolls, said working rolls each having a roll neck of truncated cone shape extending from the ends of the body portion thereof, said roll neck at the junction with the body portion having a diameter almost equal to that of the body portion, journalling means for the working rolls including spaced bearing blocks each providing bearings semi-circular in transverse cross section and having contact with a tapering roll neck of its respective roll, and said bearings being adjustable in a direction parallel to the axis of the rolls.

2. In a rolling mill, in combination, a pair of working rolls, said working rolls each having a roll neck of truncated cone shape extending from the ends of the body portion thereof, said roll neck at the junction with the body portion having a diameter substantially equal to the body portion, a frame for journalling each working roll comprising spaced bearing blocks providing semi-cylindrical bearings having contact with a tapering roll neck of its respective roll, said bearings having an inside surface shaped to conform with the taper of the roll neck and being adjustable in a direction parallel to the axis of the roll.

3. In a rolling mill, in combination, a pair of working rolls, said working rolls each having a roll neck of truncated cone shape extending from the ends of the body portion thereof, said roll neck at its junction with the body portion having a diameter substantially equal to the body portion, a frame for journalling each working roll comprising spaced bearing blocks providing semi-cylindrical bearings having contact with a roll neck of its respective roll, each bearing having a trapezoidal shape in longitudinal cross section and being adjustable in a direction parallel with the axis of the roll.

4. In a rolling mill, in combination, a pair of working rolls having their body portions in contact, a back-up roll for each working roll, each working and back-up roll having a tapering roll neck extending from the ends of the body portion thereof, and a frame for journalling each roll including spaced bearing blocks integrally joined by connecting members, and bearing inserts supported by each bearing block adapted to contact a tapering roll neck of its respective roll, said bearing inserts being adjustable in a direction parallel with the axis of the roll.

5. In a rolling mill, in combination, a pair of working rolls, said working rolls each having a roll neck of truncated cone shape extending from the ends of the body portion thereof, journalling means for each working roll including a rigid frame providing spaced bearing blocks, said bearing blocks having semi-cylindrical grooves therein, each groove receiving a bearing of trapezoidal shape in cross section adapted to have contact with the tapering roll neck of a working roll.

6. In a rolling mill, in combination, a pair of working rolls, a back-up roll for each working roll, said working and back-up rolls each having a tapering roll neck extending from the ends of the body portion thereof, journalling means for the rolls including members providing bearings adapted to contact with a tapering roll neck of its respective roll, hydraulic jacks located between each roll neck of the lower back-up roll and its respective bearing block for vertically lifting the back-up roll off its bearings in order to facilitate initial rotation thereof.

7. In a rolling mill, in combination, a pair of working rolls, a back-up roll for each working roll, said working and back-up rolls each having a tapering roll neck extending from the ends of the body portion thereof, journalling means for the rolls including members providing bearings adapted to contact with a tapering roll neck of its respective roll, a saddle positioning a pair of rollers in contact with each roll neck of the lower back-up roll, and hydraulic jacks for elevating each saddle to lift the roll off its bearings in order to facilitate initial rotation thereof.

CHARLES P. KIMMEL.